United States Patent [19]

Doodson et al.

[11] Patent Number: 5,560,481
[45] Date of Patent: Oct. 1, 1996

[54] HOLDER FOR A RECTANGULAR CASSETTE

[75] Inventors: Peter J. Doodson; Paul J. F. Van Weele, both of Eindhoven, Netherlands

[73] Assignee: U.S. Philips Corporation, New York, N.Y.

[21] Appl. No.: 327,122

[22] Filed: Oct. 21, 1994

Related U.S. Application Data

[63] Continuation of Ser. No. 101,334, Aug. 2, 1993, abandoned, which is a continuation of Ser. No. 811,558, Dec. 20, 1991, abandoned, which is a continuation-in-part of Ser. No. 701,551, May 16, 1991, abandoned.

[51] Int. Cl.$^6$ ..................................................... B65D 85/67
[52] U.S. Cl. ..................... 206/387.1; 206/459.5
[58] Field of Search ........................ 206/387, 1.5, 444, 206/485, 459, 45.31, 45.34, 425, 555, 449, 476, 387.1, 387.13, 387.14, 387.15, 459.5; 211/40

[56] References Cited

U.S. PATENT DOCUMENTS

| | | | |
|---|---|---|---|
| 611,063 | 9/1898 | Davis | 206/45.31 X |
| 2,889,036 | 6/1959 | Davies | 206/449 X |
| 3,760,937 | 9/1973 | Van Wyngarden et al. | 206/387 |
| 3,926,310 | 12/1975 | Ackeret | 206/387 |
| 4,191,292 | 3/1980 | Schweizer | 206/387 |
| 4,240,551 | 12/1980 | Osanai | 206/387 |
| 4,365,712 | 12/1982 | Oishi et al. | 206/387 |
| 4,365,713 | 12/1982 | Ekuan . | |
| 4,383,610 | 5/1983 | Boshears | 206/387 |
| 4,572,369 | 2/1986 | Morris | 206/387 |
| 4,678,080 | 7/1987 | Nelson | 206/387 |
| 4,760,914 | 8/1988 | Gelardi et al. | 206/387 X |
| 4,928,818 | 5/1990 | Friess et al. | 206/387 X |
| 4,948,022 | 8/1990 | VanDycke | 206/387 X |
| 5,251,746 | 10/1993 | Gresh et al. | 206/475 X |

FOREIGN PATENT DOCUMENTS

| | | |
|---|---|---|
| 2508222 | 10/1981 | France . |
| 2632759 | 6/1989 | France . |

*Primary Examiner*—Jacob K. Ackun
*Attorney, Agent, or Firm*—John C. Fox

[57] ABSTRACT

A holder for a rectangular cassette such as a magnetic-tape cassette comprises two parallel main walls and, three interconnecting transverse walls, and one short open side through which a cassette can be inserted into or removed from a cassette-receiving space defined by said walls. One of the main walls of the holder has a window which exposes a cassette main wall, provided with a label. The window of the holder is at least partly open, thereby enabling the cassette, when the holder is held in the palm of one hand, to be pushed out at least partly with a thumb, from which position the cassette can be loaded into a player/recorder by a loading mechanism.

22 Claims, 10 Drawing Sheets

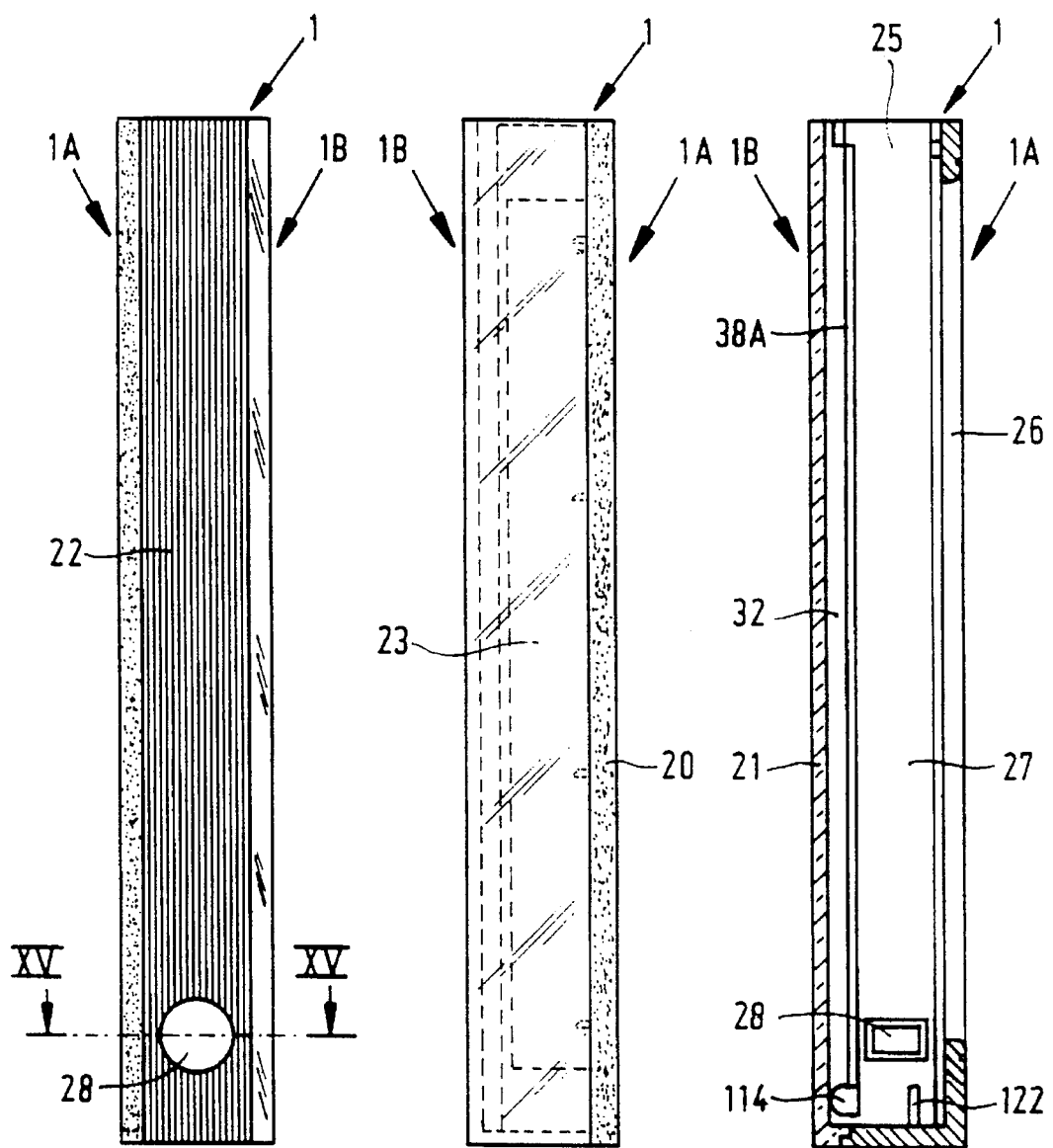
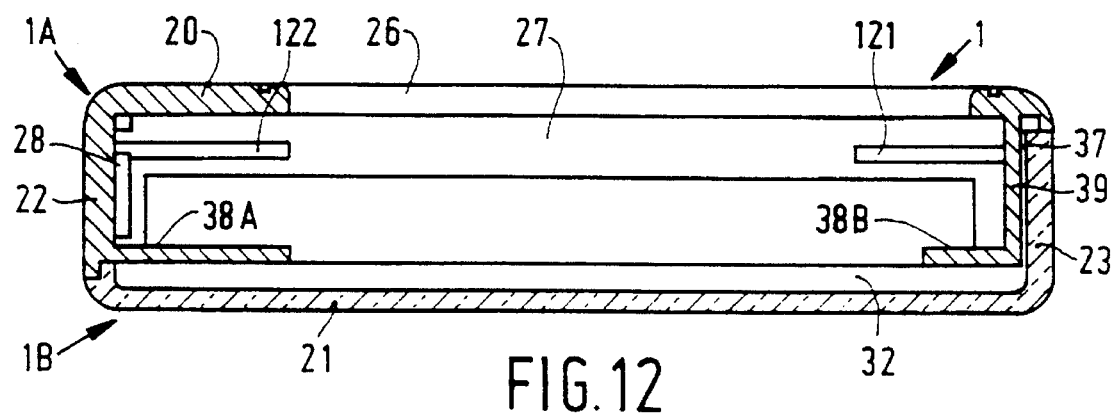

HOLDER FOR A RECTANGULAR CASSETTE

CROSS REFERENCE TO RELATED APPLICATIONS

This is a continuation of application Ser. No. 08/101,334, filed Aug. 2, 1993, now abandoned, which is a continuation of Ser. No. 07/811,558, filed Dec. 20, 1991, now abandoned, which was a continuation-in-part of Ser. No. 07/701,551, filed May 16, 1991 and also now abandoned.

BACKGROUND OF THE INVENTION

The invention relates to a holder for a rectangular cassette provided with a recording medium, which cassette has a cassette main wall optionally provided with a label, which holder comprises two main walls, a front wall having a window and a rear wall, which walls are parallel to the cassette main wall; two long side walls, one short bottom wall; and one open side opposite the short bottom wall; said holder walls bounding a cassette-receiving space into which the cassette can be inserted via the open side.

A holder of this type is known from FR-PA 2,632,759 as a container for video cassettes. One of the short sides is open for inserting a cassette into or removing it from the cassette-receiving space. The holder is made of a plastic and has a narrow plastics window. One of the long sides of the holder is also transparent.

Many of the prior-art holders have several disadvantages. Even if a cassette has been inserted correctly into the holder, i.e. with its back facing outward, it is difficult to ascertain what programme has been prerecorded because the label on the back of the cassette is narrow and a text on this back label is difficult to recognize from a distance. Another disadvantage is that the cassette tends to slip out of the holder through the open side. Yet another disadvantage is that two hands are needed to remove the cassette from the holder.

All these disadvantages occur when the prior-art holder is used in conjunction with video cassettes, but become even more serious when it is used in conjunction with prerecorded audio cassettes. This is particularly so when this cassette is an audio cassette of a new type as proposed by the Applicant, see the U.S. patent application Ser. No. 685,384, filed Apr. 12, 1991, Attorney's Docket No. PHN 13,455, herewith incorporated by reference. This new cassette, a so-called digital audio cassette, is to be marketed inter alia in a version in which the magnetic tape has been provided with a music programme in a digital format by the relevant music industry. On a main wall, such music cassettes will have a large label providing the kind of pictorial and text information as is customary for gramophone record and Compact Disc packages. In the case of gramophone records and Compact Discs, the pictorial and text information is provided respectively on and in the package. In the case of said digital music cassette the cassette, itself can be provided with a decorative and informative label which largely covers one main (front) wall of the cassette. The back of the cassette may also be provided with a label. Obviously, due to the presence of reel shaft insertion holes, this back label is much smaller and can therefore accommodate only a minimum of information which, moreover, can be read only at close range, as in the case of the afore-mentioned video cassettes.

OBJECTS AND SUMMARY OF THE INVENTION

The invention has for one of its objects to provide a holder of the type defined in the opening paragraph which enables avoidance of the above-mentioned disadvantages and is characterised in that the window in the front wall comprises an open part, which open part is dimensioned in such a way that, when the holder is held in the palm of a hand, the cassette can be pushed at least partly out of the holder with the thumb of the same hand in contact with a cassette main wall.

As stated hereinbefore, it is a drawback of the prior-an holder that both hands must be used to remove the cassette from the holder. This is particularly inconvenient with pre-recorded cassettes because these cassettes are very popular for use in car-radio recorders and portable radio-recorder apparatus. Especially in cars, it is important that a cassette can be removed from its container with one hand, because it is necessary for the driver to keep at least one hand on the steering wheel. With portable apparatus, it is also advantageous if the portable apparatus can be held in one hand and the cassette can be removed from its container with the other hand.

An embodiment which is of particular interest is characterised in that the window is wholly open. In said formerly proposed digital cassettes, at least with specific embodiments of the cassette, the label is protected by a transparent cover connected to the cassette. In the proposed embodiment it is no longer necessary to use an imperforate window in the holder, which not only saves material for the holder but in a surprisingly simple manner also enables the cassette to be pushed out with the thumb via the large opening in the main wall of the holder.

According to a preferred embodiment of the invention, the dimensions of the window are substantially equal to the dimensions of the label of the cassette. This embodiment enables all the relevant pictorial and text information on the cassette to be observed at a glance through the holder window, while at the same time all the non-relevant parts of the cassette are covered.

In order to avoid the afore-mentioned disadvantage of the prior-art holders that a cassette can readily fall out of its package, a further characteristic feature of the invention is important, which characteristic feature is that the holder comprises internal holding means for clamping a cassette which has been inserted into the cassette receiving space. In this respect a further embodiment is important, which is characterised in that the holding means comprise an elastic holding member which is situated in a transverse wall of the holder and which is deformed elastically by an inserted cassette. Suitably, use is made of a further characteristic feature in accordance with which the holding member is made of a material which is comparatively easy to deform in comparison with the material of the holder. This embodiment can be realised with advantage by the use of a further embodiment which is characterised in that the holding member comprises a plug arranged in an opening in a transverse wall of the holder. Tests have shown that the use of the above-mentioned embodiments effectively prevent the cassette from inadvertently falling out of the holder. The rubber-like properties of the holding member preclude damage to the cassette and to the holder.

In music shops, gramophone records, Compact Discs as well as analog music cassettes are generally offered for sale "dead", that is to say, only empty containers provided with pictorial and text information of interest to the prospective buyer of the medium, are present in the display racks. The actual music-carrying medium is only inserted into the container in the case of purchase. Obviously, "dead" selling serves to preclude theft of the media. In the case of gramophone records, the pictorial and text information is printed on the sleeves. In the case of music cassettes and Compact Discs, a transparent plastic case is used which contains a printed enclosure which is readily visible from the outside of the case. In order to enable the "dead" sale of music cassettes when the holder in accordance with the invention is used, the holder has an internal space at the side opposite the window for the insertion of an enclosure, which may comprise a plurality of pages, and which in the absence of a cassette is visible through the window. The front of the enclosure can be given an appearance which is similar to the appearance of the label of the cassette. While it will be obscured when the cassette is in the holder, it will be visible through the window when the holder is empty, and thus very suitable for the "dead" sale of the music cassette.

The holder can also be constructed in such a manner that the back side of the enclosure is visible through the rear wall of the holder, for example by making the rear wall transparent or providing it with a suitable opening. The back side of the enclosure can therefore be provided with pictorial and text information which is visible at all times, i.e. both when the cassette is in the holder and when the cassette is not in the holder.

A further embodiment which is of interest is characterised in that the enclosure space communicates with a flap space adjacent a side wall of the holder, and the enclosure has a side flap which extends into the flap space. The flap can also be provided with text and/or pictorial information which is always visible from the outside of the cassette.

Preferably, the holder comprises two separate sections which are secured to one another and which each comprise a main wall and an adjoining transverse wall. For example, one section comprises the front wall with an adjoining side wall and the other section comprises the rear wall with the other side wall, providing the advantage of a simple construction requiring a small amount of material. The holder does not comprise any moving parts and, moreover, the holder requires only two parts, which can be manufactured from a plastic by well-known injection-moulding techniques. Said other section is made of a transparent plastics. Preferably, this embodiment is combined with a further embodiment which is characterised in that said one section is made of a non-transparent plastics and substantially covers those parts of a cassette present in the holder which adjoin the label.

To facilitate the manufacture of the holder and to minimize material consumption, the enclosure space is in open communication with the cassette receiving space, and between the enclosure space and the cassette receiving space ridges are formed at opposite sides of the holder for cooperation with the side edges of the enclosure. For a correct guidance of the cassette in that case, the holder has a flap space, defined by an internal transverse wall, which forms part of one of the sections of the holder, is interposed between the flap space and the cassette receiving space in such a manner that the flap space is bounded by a side wall and the internal transverse wall. An additional advantage of this embodiment is that if the cassette is not situated correctly in the holder the flap is nevertheless enclosed correctly in the flap space and, moreover, that the cassette receiving space is distinctly bounded, which is important in view of the afore-mentioned "dead" sale of the digital music cassette.

The holder in accordance with the invention comprises only a small number of parts, does not require any moving parts, and offers a high degree of functionality, as already set forth hereinbefore. However, if desired, an embodiment may be used which is characterised in that the open side of the holder can be covered with a cover which is pivotally connected to the holder. This embodiment provides an additional guarantee that the cassette cannot readily fall out of the container. Another advantage is that the holder has an attractive enclosed appearance. Another interesting embodiment of the invention is characterised in that the cover is connected to a main wall by a plastic integral hinge. Consequently, it is not necessary to provide the holder with separate parts. A further embodiment which is of interest is characterised in that the cover is pivotally connected to the rear wall of the holder and there is provided a spring mechanism permitting the cover to assume only two stable positions, i.e. either a fully closed position or a fully open position. Suitably, the transparent part of the holder is made of a styrene/butadiene-block copolymer. Plastics of this type are suitable for forming integral hinge constructions and are available in a glass-clear quality.

In one embodiment of the invention the holder has a plurality of cassette-receiving spaces. Consequently, the holder in accordance with the invention is also suitable for holding two or more cassettes, for example in the case that a recording cannot be accommodated on a single recording medium.

The invention relates not only to a holder for a rectangular cassette but also to a method of removing a cassette from a holder, i.e. by taking the holder with the cassette held therein in one hand, pushing the cassette at least partly out of an open side of the holder with the thumb of the same hand through an opening in a wall of the holder, and subsequently removing it completely from the holder. As already set forth hereinbefore, such a method is particularly advantageous when cassettes are used in automotive or portable apparatus. Such a method is of particular advantage if it is combined with the loading of the cassette into an apparatus via a slot in the front partel of said apparatus, the method comprising the insertion of the part of the cassette which has been pushed out of the holder into the slot, after which the cassette is gripped by a loading mechanism of the apparatus, which mechanism pulls the cassette further out of the holder and into the apparatus. This method of loading a cassette into a playing apparatus minimizes the operations to be performed by the user. The user no longer has to remove the cassette completely from the holder and merely has to push the cassette out of the holder over some distance with his thumb. The remainder of the operation is performed by the loading mechanism of the apparatus.

Also very interesting is a method of removing a cassette from an apparatus and inserting it into a holder, the method comprising the positioning of the holder with an open side before the front partel of the apparatus opposite a slot in the front partel and the at least partial insertion of the cassette into the holder through the slot by the apparatus. With this method the insertion of the cassette back into the holder is also performed at least partly by the apparatus. This enables a driver of a car to keep his attention focused on driving and on the traffic. A further improvement of the last-mentioned method comprises the actuation of switching means by the holder and, as a result of this, the outward movement of the cassette by means of an electric motor. In this way automatic removal of the cassette from the apparatus and reinsertion of the cassette into the holder is realised. A point which still requires some attention from a driver is the correct positioning relative to the slot in the apparatus. In order to preclude this problem the invention provides a further method, comprising the guidance of the holder by guide surfaces provided around the slot to a docking position defined by stop means, in which position the cassette receiving space is disposed in line with the path along which the cassette is moved by the loading mechanism of the apparatus.

If desired, a method may be used, comprising the at least partial insertion of the holder with the cassette into an apparatus and the movement of the cassette into/out of the holder by the apparatus itself inside the apparatus. This method leads to further improved user convenience.

The invention relates not only to the method but also to an apparatus suitable for the method in accordance with the invention.

Preferably, an apparatus in accordance with the invention may be characterised in that the apparatus comprises docking means adapted to cooperate with a cassette and comprising stop means which define a docking position for a cassette relative to a path along which the cassette is movable by a loading mechanism of the apparatus. When an apparatus is adapted, as described above, to push the cassette together with the holder completely or partly into the apparatus, the apparatus will comprise internal means for removal of the cassette from the holder. These means may comprise retaining means for retaining the holder, in combination with pushing means for pushing the cassette out of the holder through the window. The pushing means may comprise, for example, a pushing member which simulates the function of a user's thumb, or a rotary member which bears resiliently on the cassette with friction and, as it rotates, moves the cassette out of and, if necessary, subsequently moves the cassette back into the holder.

BRIEF DESCRIPTION OF THE DRAWINGS

The invention will now be explained with reference to the drawings which, by way of non-limitative illustration of the invention, relate to some possible embodiments of the invention intended for use with a digital music cassette and in which:

FIG. 9 is a side view of the holder shown in FIG. 6, as indicated by the arrow IX, FIG. 10 is a side view of the holder shown in FIG. 6, as indicated by the arrow X, FIG. 11 is a cross-sectional view of the holder shown in FIG. 6, taken on the arrows XI—XI, FIG. 12 is a cross-sectional view of the holder shown in FIG. 6, taken on the arrows XII—XII.

DESCRIPTION OF THE PREFERRED EMBODIMENTS

Figure 1:
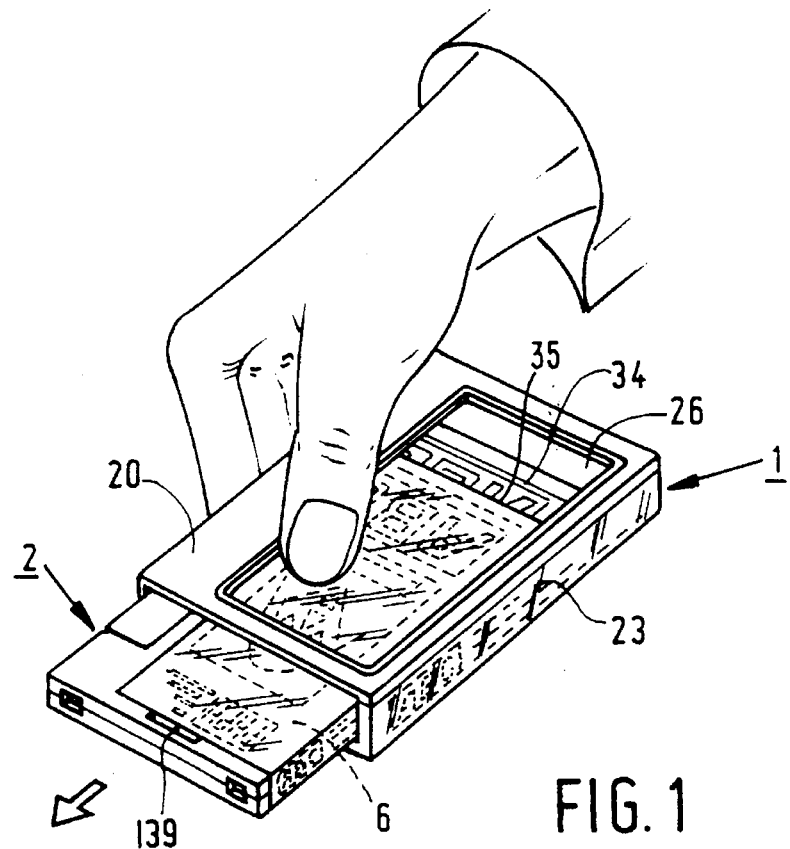
FIG. 1 is a perspective view of a holder and a digital music cassette which has been slid out over some distance by a user with the thumb of the right hand.

The holder 1 shown in the drawings is intended as a container for a rectangular cassette 2. For an even better protection of both the container and the cassette therein this assembly may be wrapped in cellophane or shrink foil in the customary way.

For a correct understanding of the remainder of the description the cassette will be described briefly with reference to FIGS. 2 to 5. The cassette is a "digital music cassette", i.e. a cassette with a magnetic tape 3 provided with a music programme in a digital format by a music comparty. For more details on the digital cassette, which has been proposed earlier by the Assignee, and the digital recording and reproducing system to which the cassette belongs reference is made to the Applicant's copending U.S. patent applications: Ser. Nos. 532,469, filed May 31, 1990, Attorney's Docket No. PHN 12.959), "System for recording/ reproducing signals on magnetic tape in cassettes"; 545,307, filed Jun. 26, 1990 (PHN 13.003), "System for recording/ reproducing signals on/from a magnetic tape in a cassette"; 547,741, filed Jul. 3, 1990) PHN 13.018), "Reversible cassette"; Netherlands Patent Applications 89-01712 (PHN 13.020), "Longitudinal magnetic-tape recording system, magnetic-tape apparatus for use in the system, and magnetic head for use in the magnetic-tape apparatus"; 89-02843 (PHN 13.185, 13.145), "System for recording/reproducing signals on magnetic tape in cassettes"; U.S. Patent application Ser. No. 685,384, filed Apr. 12, 1991 (PHN 13.455), "Cassette with magnetic tape on two coplanar reels"; two Austrian Patent Applications A2049-90 (PHO 90.505) and (PHO 90.506), both entitled "Kasette für einen Aufzeichnungsträger", and U.S. patent application Ser. No. 629,512, filed Dec. 18, 1990 (PHD 90.197), "Anordnung bestehend aus einem Magnetbandkassettengerät mit einem Laufwerk und Lademechanismus für Magnetbandkassetten und aus einer Magnetbandkassette".

All the above-mentioned Patent Applications are incorporated herein by reference.

Figure 3:
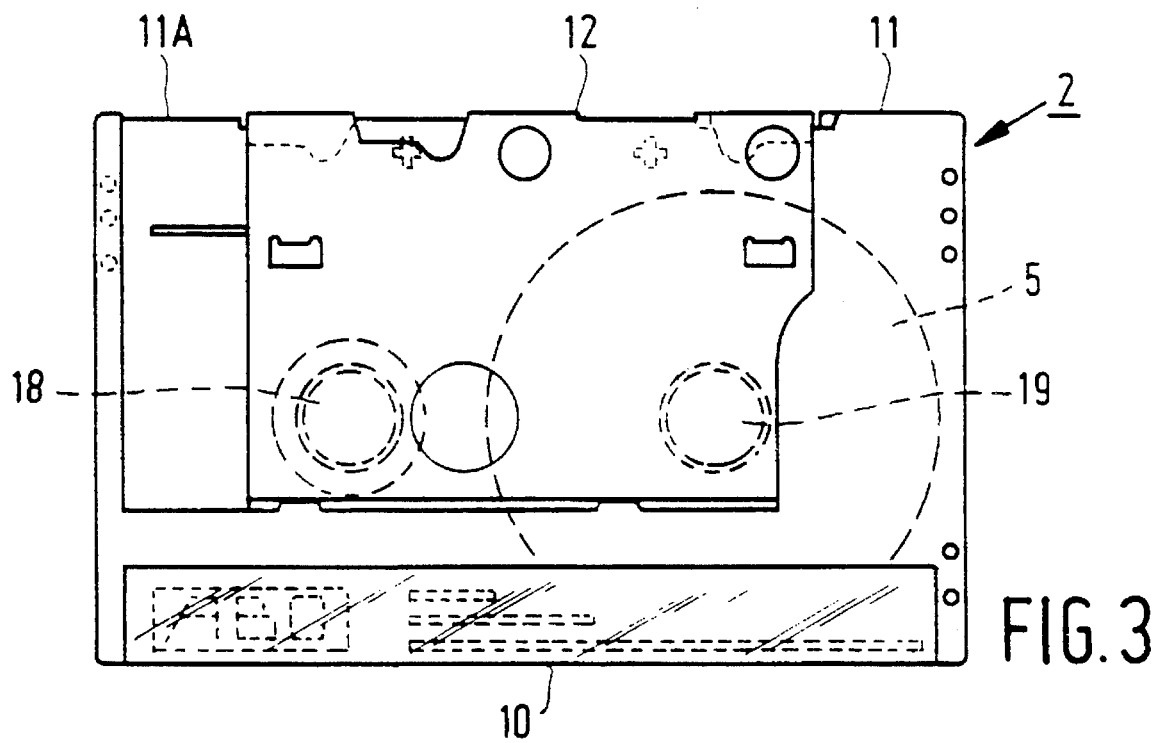
FIG. 3 is an underneath view of the music cassette shown in FIG. 2.
Figure 4:
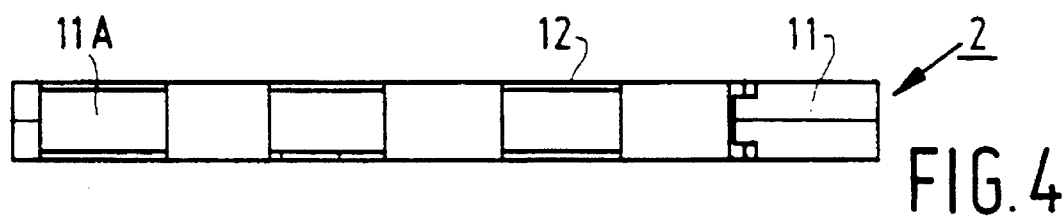
FIG. 4 is a front view of the music cassette shown in FIGS. 2 and 3.
Figure 5:
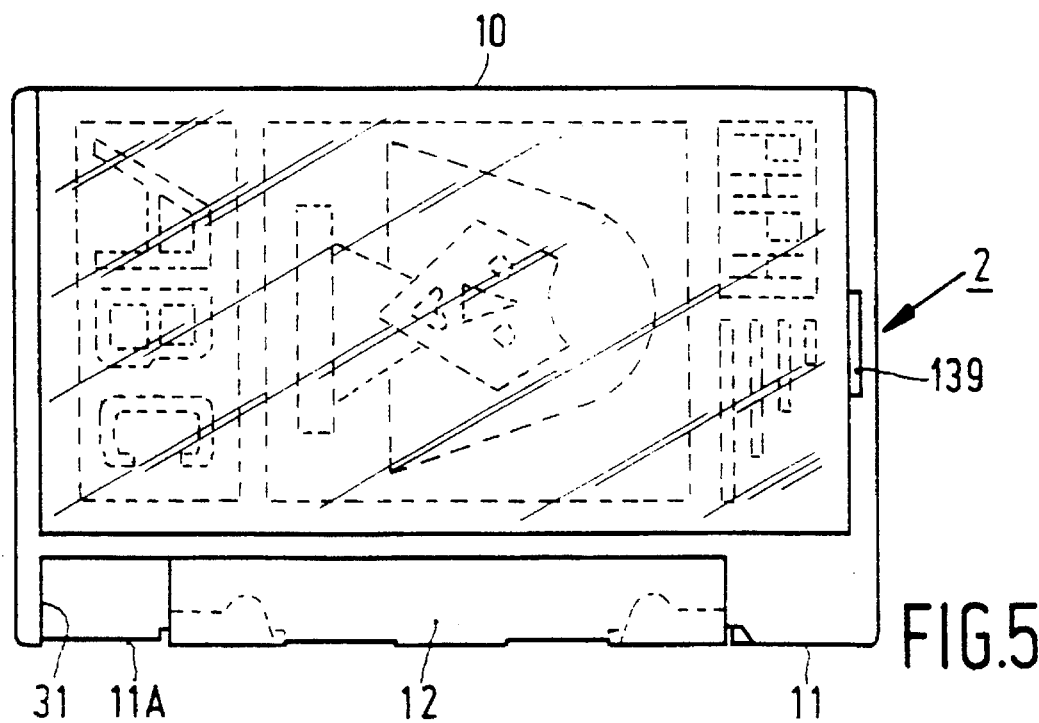
FIG. 5 is a plan view of the music cassette shown in FIG. 2.
Figure 6:
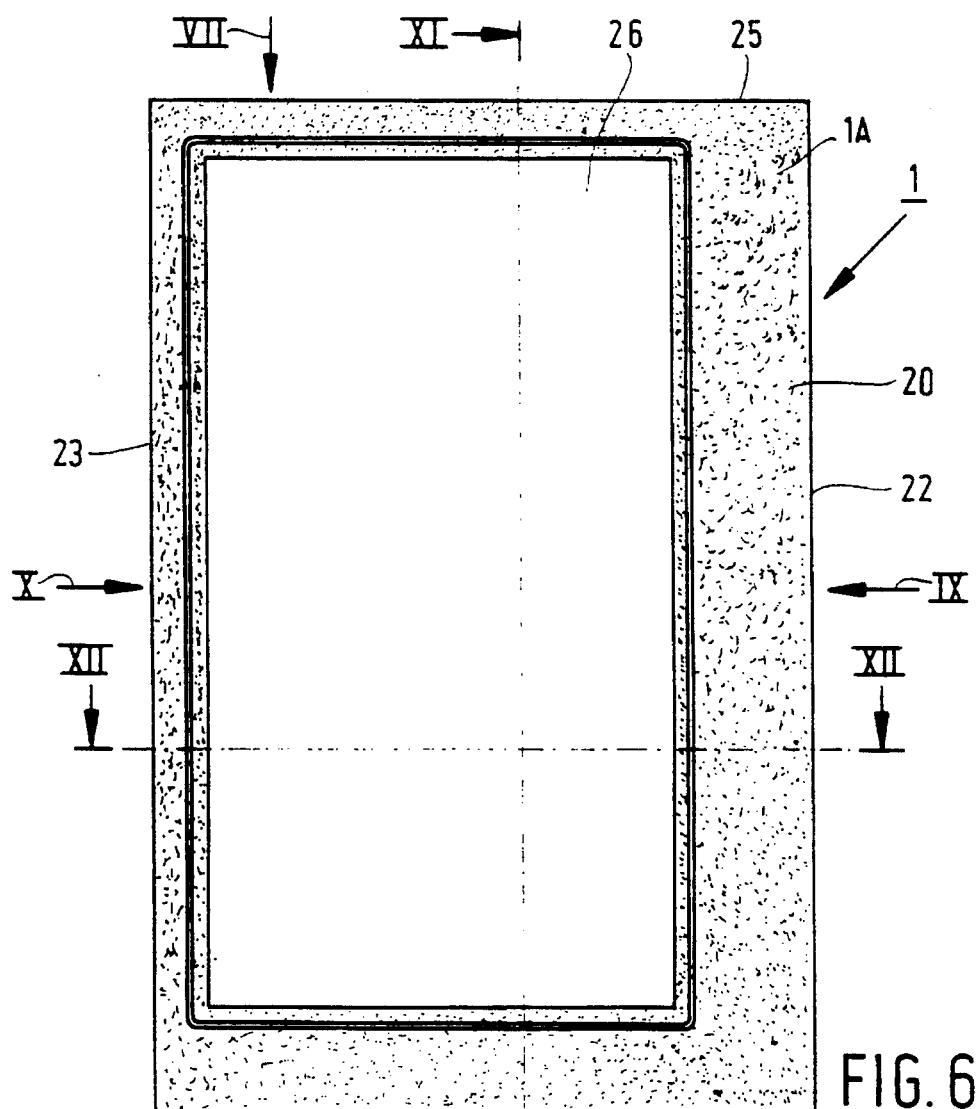
FIG. 6 is a plan view of a holder in accordance with the invention for the music cassette shown in FIGS. 2 to 5.

The cassette comprises two main walls 4 and 5 at respectively the upper side and the lower side of the cassette. The main wall 4 is provided with a label 6 which is made of, for example, paper and which may be provided with pictorial and text information, if desired in colour. To protect the label and to improve the appearance of the cassette the label is covered by a transparent cover element 7. The label has a flap 8 which is covered by a corresponding part 9 of the transparent cover element 7. The flap is situated at the back 10 of the cassette and may also be provided with pictorial and/or text information. A slide 12 is slidable over the front wall 11 of the cassette. The slide has two openings 13 and 14 to expose the openings 15, 16 and 17 in the front wall of the cassette in order to allow the entry of a magnetic-head unit, capstans and pressure rollers of an apparatus. In the closed position the slide 12 covers two openings 18 and 19 in the bottom main wall 5 of the cassette. When the slide is in the open position these openings give drive means of an apparatus access to two reel hubs of the cassette. Resilient means, not shown, urge the slide towards its closed position. Thus, normally speaking, when the cassette is outside an apparatus, the slide 12 will be in its closed position, as is shown in FIGS. 3 to 5.

The holder 1 comprises two parallel main walls 20 and 21 and three interconnecting transverse walls (two long side walls 22 and 23 and short bottom wall 24). The holder also has an open side 25 through which the cassette can be inserted into or removed from the holder. The main walls and the transverse walls thus define a cassette receiving space which is accessible via the open side 25. The main wall 20 forms a front wall of the holder. This front wall has a window 26 through which the label 6 of the cassette 2 present in the holder is visible from the outside. The other walls of the holder form a rear wall 21, long side walls 22 and 23, and a short bottom wall 24.

Figure 15:
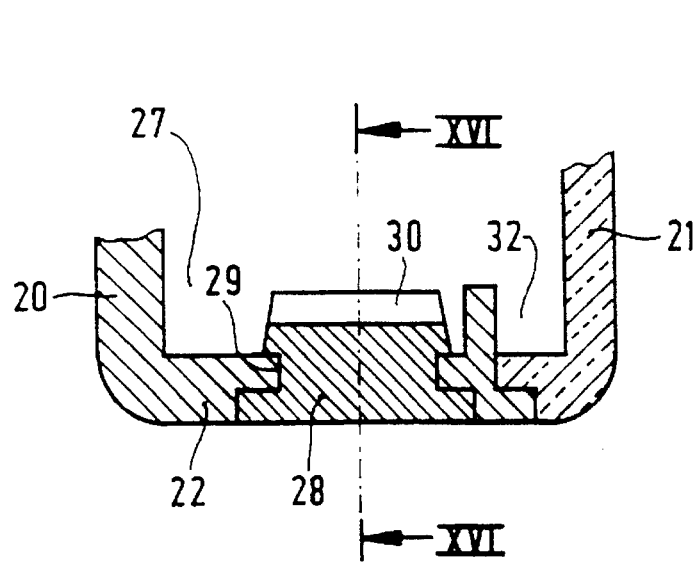
FIG. 15 is a part of a cross-sectional view taken on the arrows XIII—XIII in FIG. 9.
Figure 16:
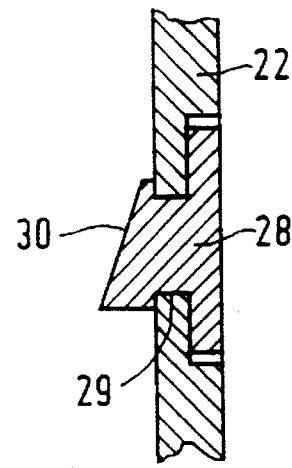
FIG. 16 is a part of a cross-sectional view taken on the arrows XIV—XIV in FIG. 15.

The holder comprises internal holding means for clamping a cassette inside the cassette receiving space 27. These holding means comprise an elastic holding member 28 which is situated in the (transverse) long side wall 22 and which is deformed elastically upon insertion of a cassette. In the present embodiment the holding member is made of a material which is readily deformable in comparison with the material of the holder, i.e. an elastomeric material or another material having rubber-like properties. It is constructed as a plug fitted in an opening 29 in the transverse long side wall 22, see in particular FIGS. 15 and 16. The opening 29 has a rectangular shape to avoid rotation of the plug 28. As will be apparent from FIGS. 15 and 16 the plug has an inclined contact face 30, so that upon insertion of a cassette into the cassette receiving space 27 the plug is deformed gradually. The plug cooperates with the part 11A of the front wall 11 of the cassette. In the closed position of the slide this part of the front wall of the cassette is not covered by the slide. The housing of the cassette has a ridge 31 which serves as a stop for the slide when the slide is opened. Preferably, the plug 28 is arranged at such a location in the side wall 22 of the holder that upon insertion of a cassette into the holder the ridge 31 moves just past the plug 28, so that the cooperation between the ridge 31 and the plug 28 assists in holding the cassette in the holder.

In the main front wall 20, the window comprises an open part having dimensions large enough to enable the cassette to be pushed at least partly out of the holder when the holder is held in the palm of one hand with the thumb on the label of the cassette. In the embodiments shown, the window 26 is completely open and has a size substantially equal to that of the label of the cassette.

At the side opposite the window 26 near the the main, rear wall 21, the holder has a separate enclosure space 32 for the insertion of an enclosure 34, which may comprise a plurality of pages 33. The enclosure is shown separately in FIG. 20. In the example shown the enclosure resembles a booklet having a booklet cover 35. In the absence of a cassette the enclosure is visible from the outside through the window 26 of the holder. This can be seen in FIG. 1, which shows a part of the cover 35 of the enclosure 34.

The cover 35 of the enclosure 34 faces the cassette receiving space 27 and has an appearance, i.e. has been provided with pictorial and text information, similar to the appearance of the label 6 of the cassette. Thus, the pictorial and text information visible through the window 26 is always the same, regardless of the presence of the cassette 2. As already stated hereinbefore, this is important for the "dead" sale of music cassettes.

Figure 20:
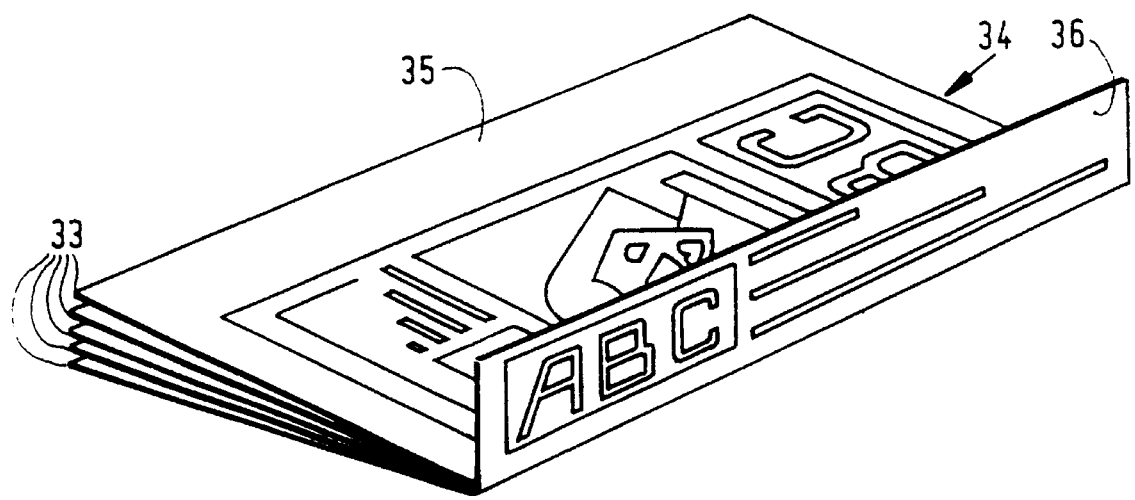
FIG. 20 is a perspective view of a text enclosure comprising a plurality of pages and a side flap.

As is apparent from FIG. 20, the enclosure 34 has a side flap 36. When the enclosure is inserted into the enclosure space 32 this flap is accommodated in a flap space 37 which communicates with the enclosure space 32, see in particular FIG. 7 and FIG. 12. The side flap 36 inter alia assists in retaining the enclosure in the enclosure space.

The holder 1 comprises two separate sections 1A and 1B secured to one another. See FIGS. 7–14. Preferably, these sections are made of a suitable plastic and can be interconnected by cementing, ultrasonic welding or in any other suitable manner. Each of the two sections comprises a main wall and an adjoining transverse wall. For example, the section 1A comprises the front wall 20 and the adjoining side wall 22 and bottom wall 24, and the section 1B comprises the rear wall 21 and the adjoining side wall 23. The section 1B is made of a transparent plastic, so that after insertion into the holder both the rear of the enclosure 34 and the outwardly facing side of the flap 36 are visible from the outside. Thus, these parts of the enclosure 34 may also be printed with suitable information for the consumer. This information need not be the same as the pictorial and text information provided on the cover 35. Indeed, the last-mentioned information is always, i.e. regardless of the presence of a cassette, visible from the outside. Therefore, the information which is visible from the outside through the transparent section 1B may be additional information.

The section 1A is made of a non-transparent plastic and this section, see in particular FIG. 1, covers all those parts of a cassette in the holder which adjoin the label 6, so that if a cassette is present the window 26 only exposes the label 6. This also contributes to the structural integrity of the holder.

Figure 7:
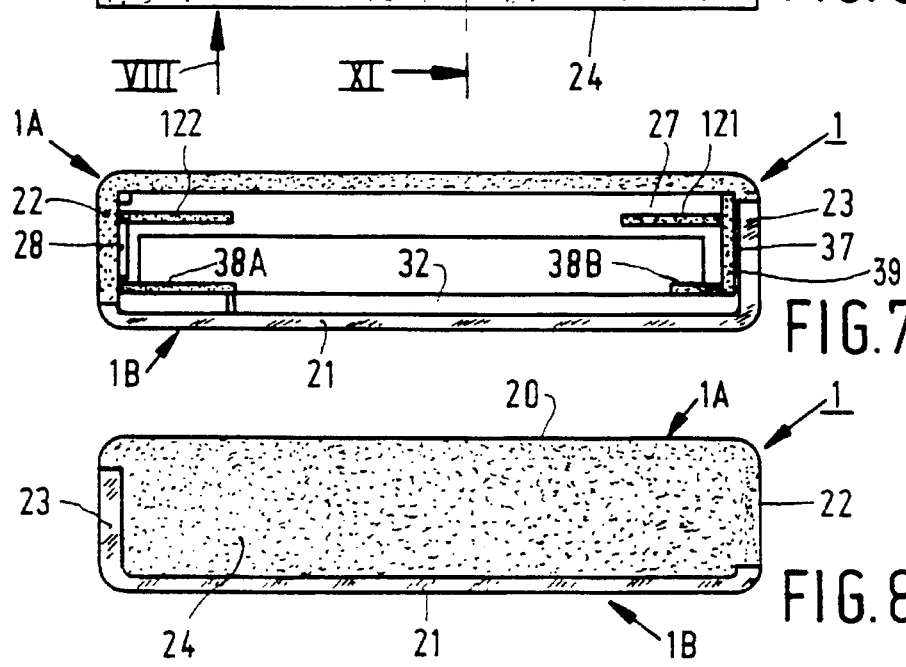
FIG. 7 is a front view of the holder shown in FIG. 6, as indicated by the arrow VII.
Figure 8:
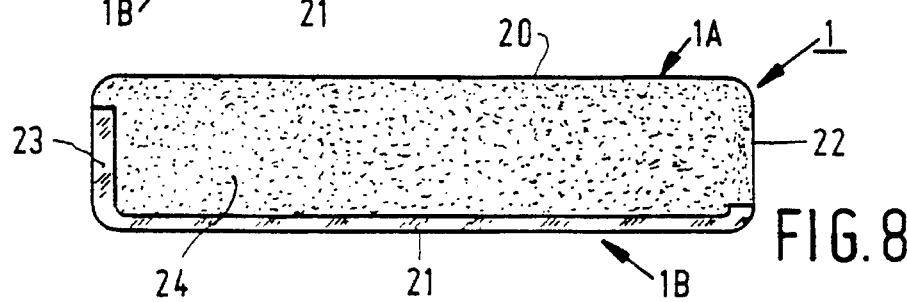
FIG. 8 is a rear view of the holder shown in FIG. 6, as indicated by the arrow VIII.

As is apparent in particular from FIGS. 7 and 11, the cassette receiving space 27 is in open communication with the enclosure space 32. Two ridges 38A and 38B extend along the long sides 22 and 23, respectively, between the two spaces inside the holder. In the embodiment shown, both ridges form part of the non-transparent section 1A of the holder. The two ridges cooperate with side edges of the enclosure 34 and thus retain this enclosure in the enclosure space. An internal transverse wall 39, which forms part of the section 1A of the holder, defines and thus is situated between the flap space 37 and the cassette receiving space 27. One side of the flap space 37 is thus bounded by the transparent side wall 23 and the other side by the non-transparent internal transverse wall 39. The non-transparent internal wall 39, by keeping side flap 36 out of the way, also helps to ensure that the cover 35 of the enclosure 34 can be read correctly in the absence of a cassette.

Figure 13:
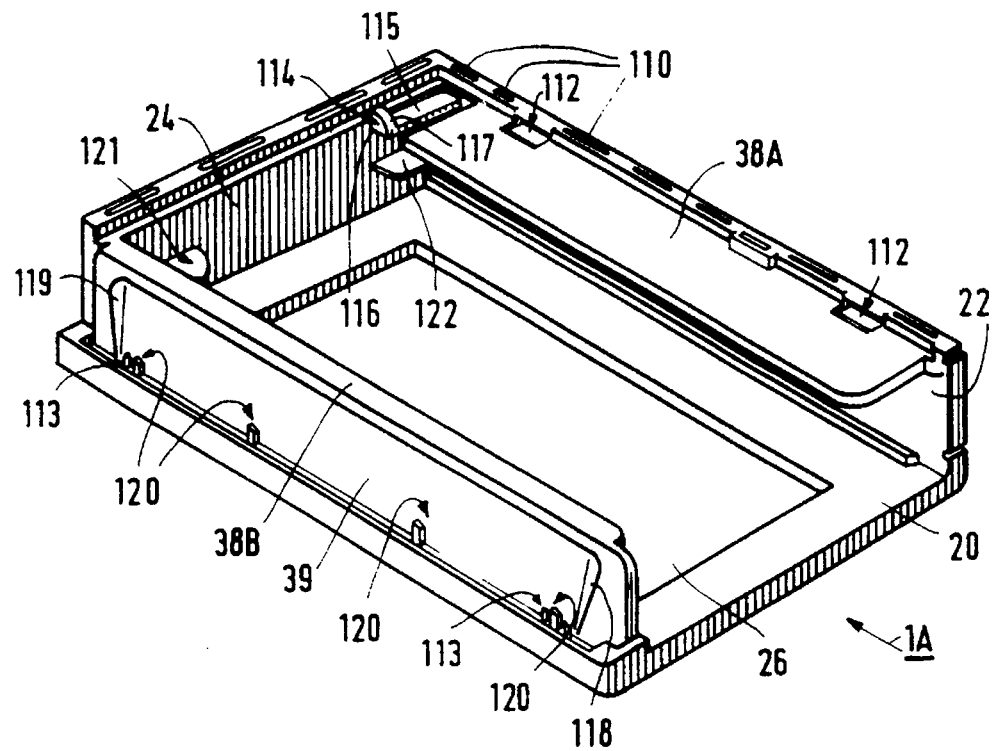
FIG. 13 shows the non-transparent part of the holder of FIG. 6 in a perspective view at the inner side of the front wall.
Figure 14:
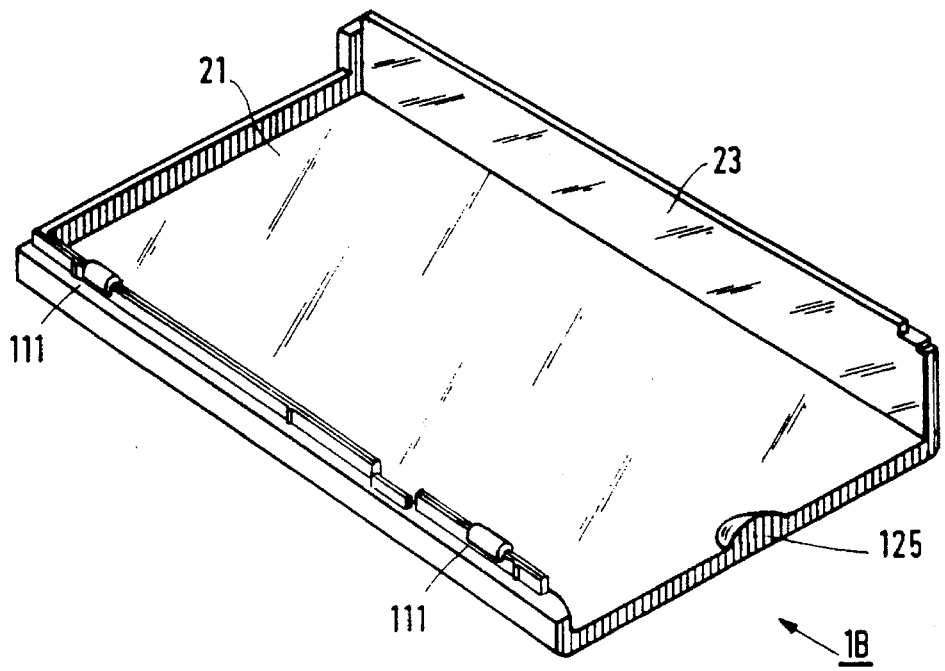
FIG. 14 shows the transparent part of the holder of FIG. 6 in a perspective view at the inner side of the rear wall.

Some details which are of importance in production will now be discussed with reference to FIGS. 13 and 14.

The sections 1A and 1B are intended to be permanently joined by ultrasonic welding. For this purpose the section 1A comprises a plurality of thin welding ridges 110 which melt during welding. The section 1B also has welding ridges at a location which is not visible in the drawing and which is situated behind the side wall 23.

The sections 1A and 1B also comprise means for provisionally assembling them, so that if desired, the sections can be disassembled for inserting the enclosure before the holder is finally welded. Said means comprise snap projections 111 which engage in corresponding recesses 112, and conical pins 113 which fit tightly in recesses, not shown in FIG. 14, in the side wall 23.

A resilient clamping member 114 for retaining the enclosure is arranged near the bottom wall 24 in line with the ridge 38A. The clamping member comprises a blade spring 115 and a run-on projection 116 with a rounded surface 117. The clamping member is made of a plastic and is integral with the section 1A. The rounded surface 117 ensures a gradual deformation of the blade spring 115 when an enclosure is inserted. The enclosure may have an opening corresponding to the run-on projection, so that the enclosure is held even more effectively.

To facilitate insertion of the side flap of an enclosure into the flap space the transverse wall 39 comprises gradually inclined portions 118, 119. In addition, there are bevelled guide projections 120. A projection 125 at the front of the section 1B constitutes a further means to prevent the enclosure from slipping out.

Figure 2:
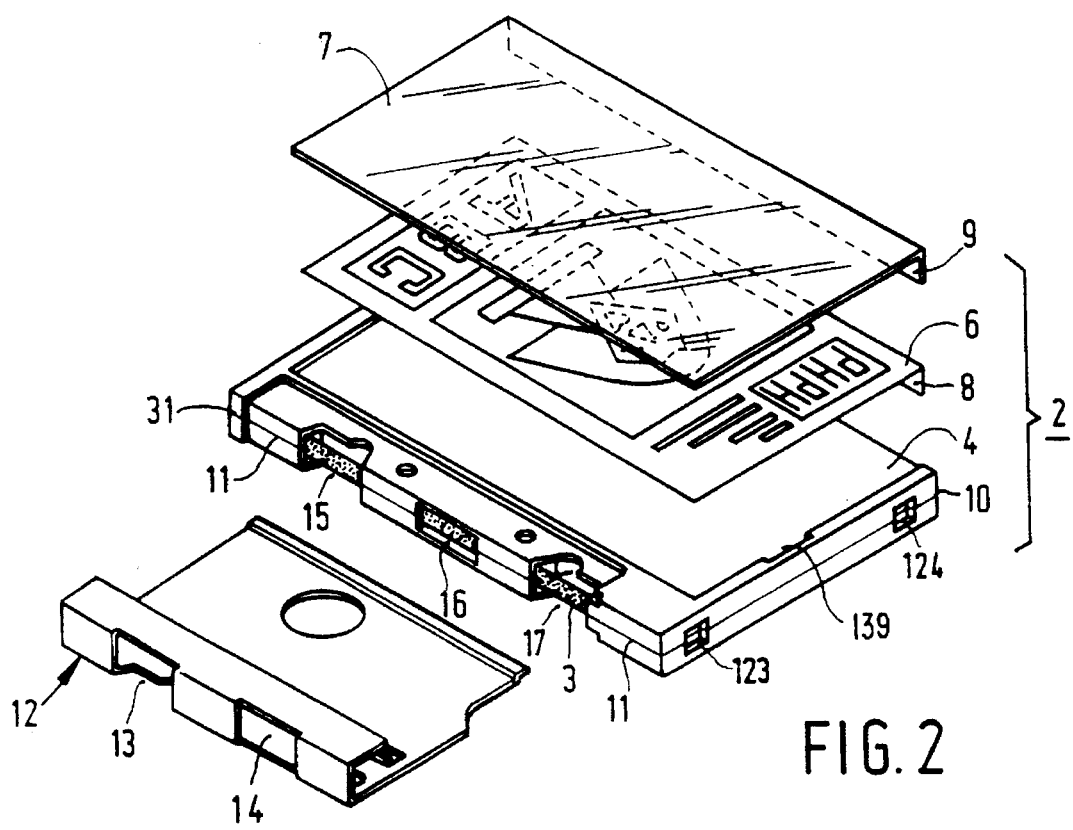
FIG. 2 is an exploded view of a digital music cassette.

The bottom wall 24 carries projections 121, 122 for cooperation with recesses 123, 124 of the cassette (see FIG. 2). These recesses have a characteristic mutually different depth, shape and position. Only when the cassette is slid into the holder in the correct orientation will the projections 121, 122 engage the recesses 123, 124 in such a manner that the cassette can be inserted wholly into the holder. In all other cases the cassette will abut against said projections in a partly inserted position. This will effectively draw the user's attention to the fact that the cassette is not oriented correctly. A correct orientation may be required in particular in view of a correct cooperation with an apparatus in accordance with an inventive method to be described hereinafter.

Figure 17:
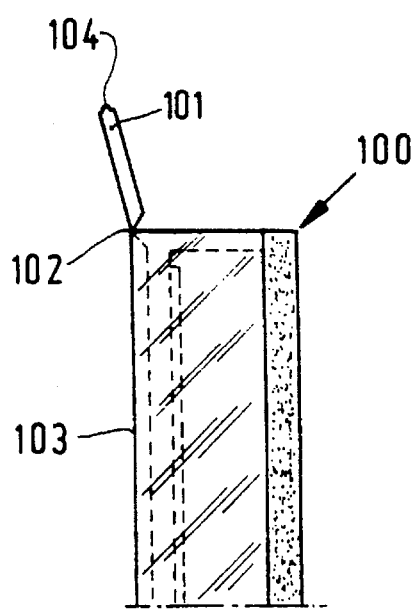
FIG. 17 is the upper part of a side view similar to that of FIG. 10 and showing an embodiment of the holder provided with a cover for closing the open side.
Figure 18:
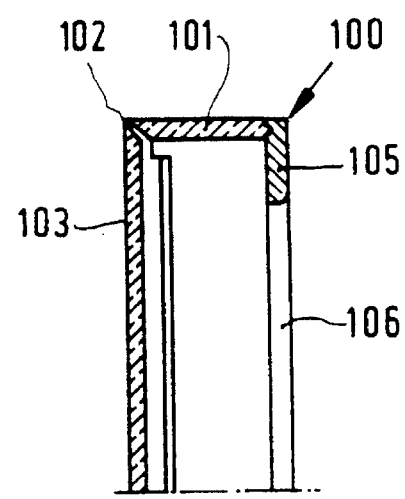
FIG. 18 is a part of a sectional view similar to that of FIG. 11 but now showing a holder with a cover as illustrated in FIG. 17.
Figure 19:
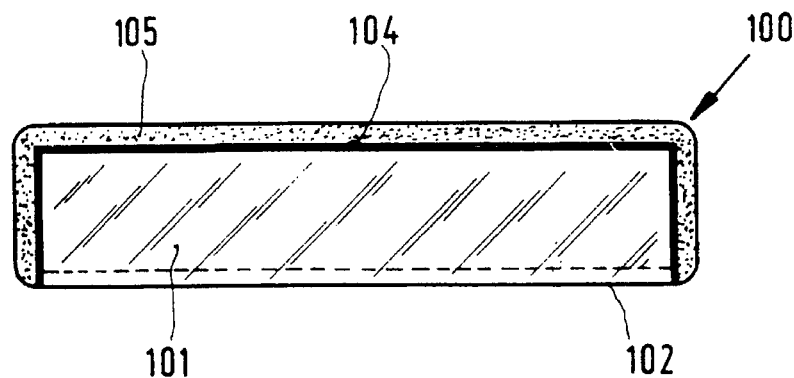
FIG. 19 is a front view similar to that in FIG. 7 but now showing a holder with a cover as illustrated in FIGS. 17 and 18.

FIGS. 17 to 19 relate to a holder 100 which largely resembles the holder 1 shown in the preceding Figures but which comprises a cover 101 which is pivotally connected to the holder at the open side of this holder. This cover is connected to the plastic rear wall 103 by a plastic integral hinge 102. A suitable plastic which is available in a glass-clear quality is, for example, a styrene/butadiene-block copolymer. Plastics of this type are available from various manufacturers.

In the present embodiment the front of the cover 101 carries a snap projection 104 which is engageable in a corresponding recess formed in the inner surface of the front wall 105 of the holder 100. This projection provides a certain degree of locking of the cover 101 in its closed position. This locking is such that it is easy to cancel by pushing out the cassette via the open window 106 in the front wall. However, in principle, locking can be such that the cover has to be opened before removal of the cassette from the holder.

After the comprehensive description of the single holder, the double holders shown in FIGS. 21–24, which bear much resemblance to the single holder, will be described only briefly.

Figure 21:
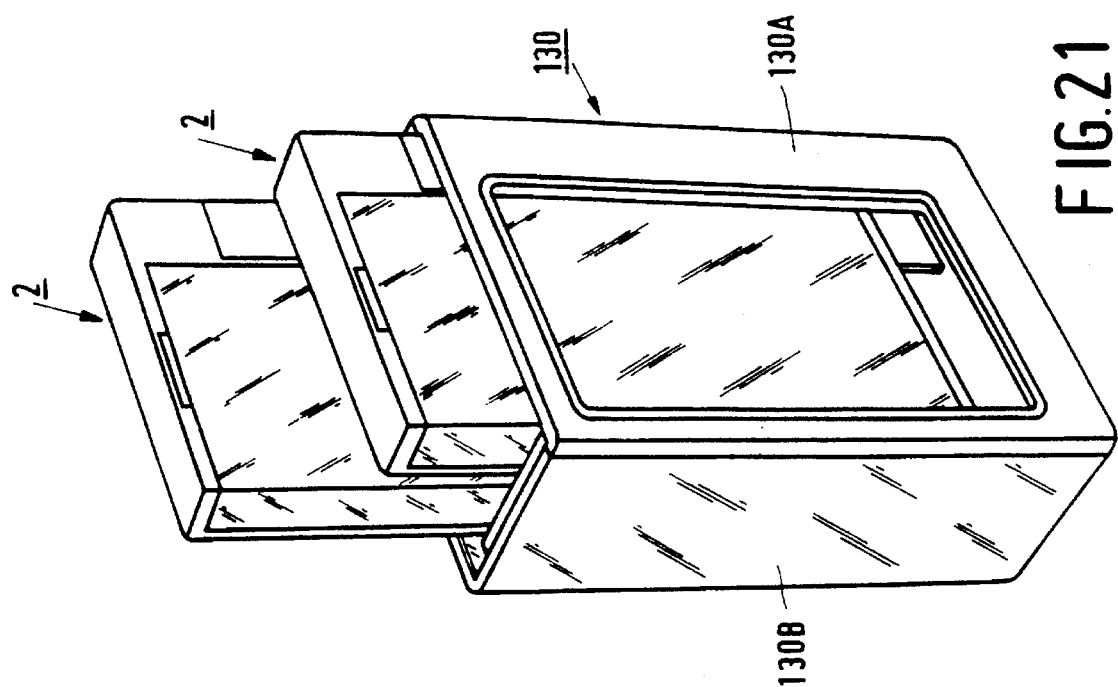
FIG. 21 is a perspective view of a holder having two cassette-receiving spaces arranged one behind the other and two cassettes partly inserted therein.
Figure 22:
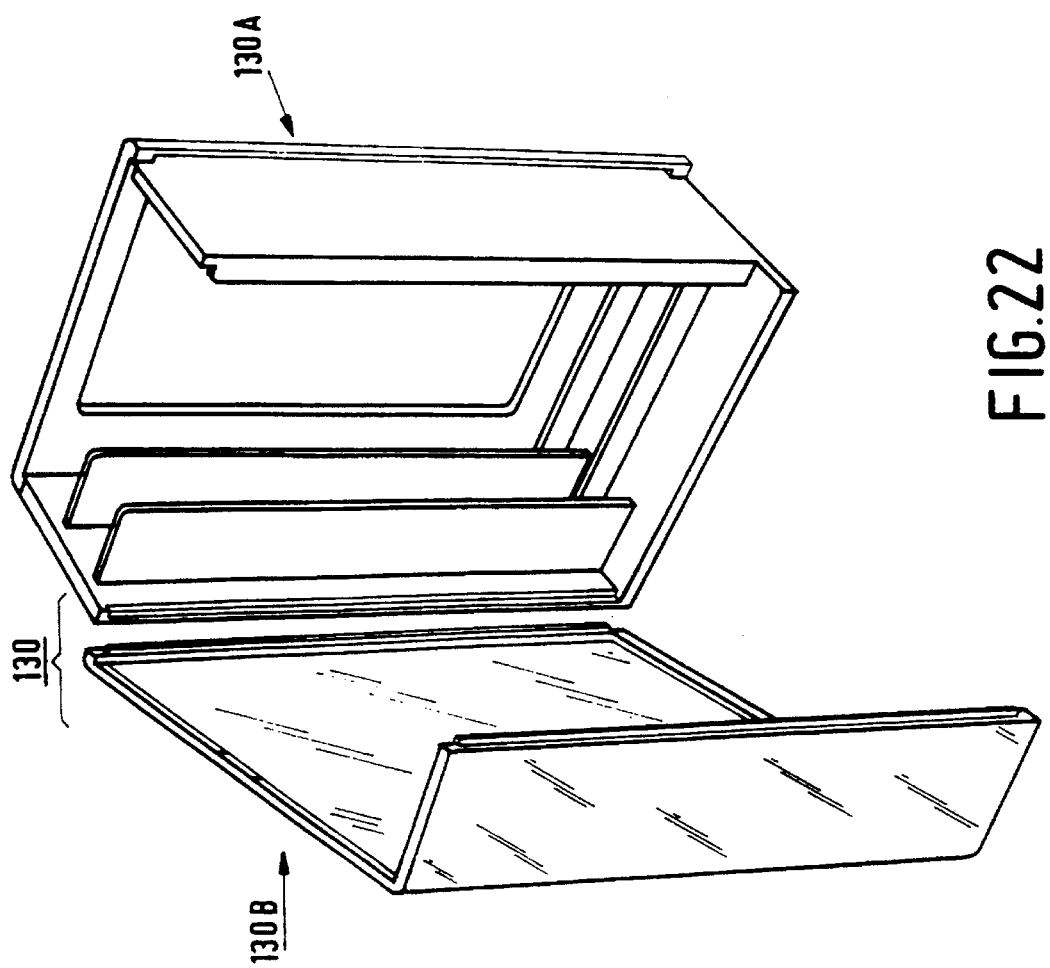
FIG. 22 is a perspective view of the empty holder of FIG. 21, viewed obliquely from the rear, the transparent rear part being removed from the non-transparent front part.

In the holder 130 shown in FIGS. 21, 22, the receiving spaces are disposed in line. The holder has a non-transparent section 130A and a transparent section 130B. The holder is thicker than the holder 1, so that the side flap of an enclosure can be larger. The enclosure may provide information about both cassettes.

Figure 23:
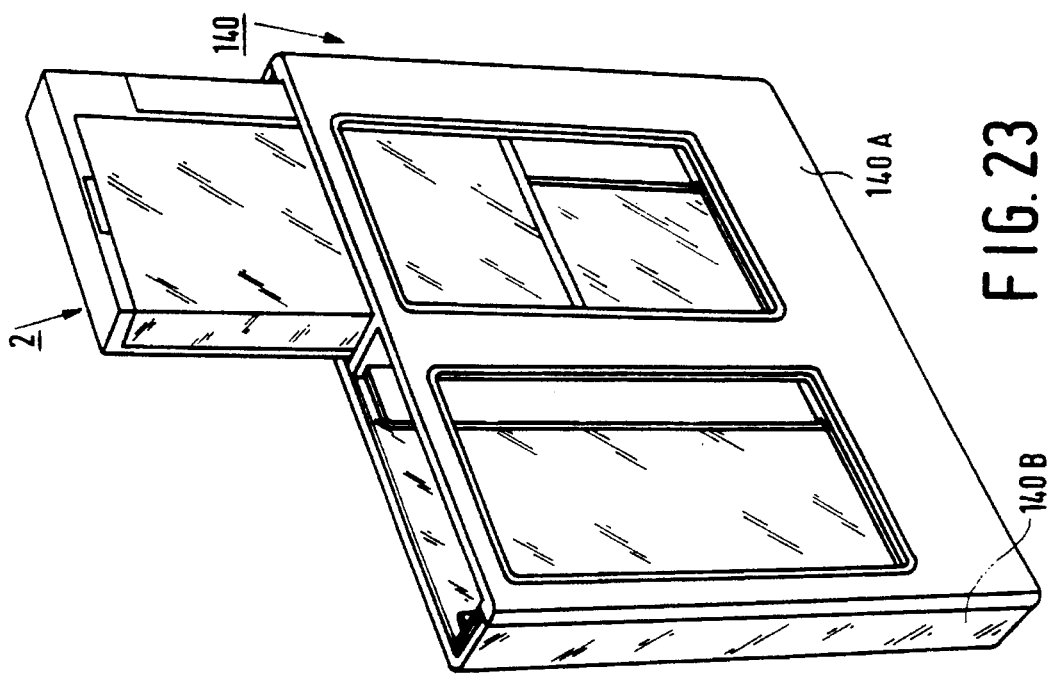
FIG. 23 is a perspective view of a holder having two juxtaposed cassette-receiving spaces and a cassette inserted partly in one of these spaces.
Figure 24:
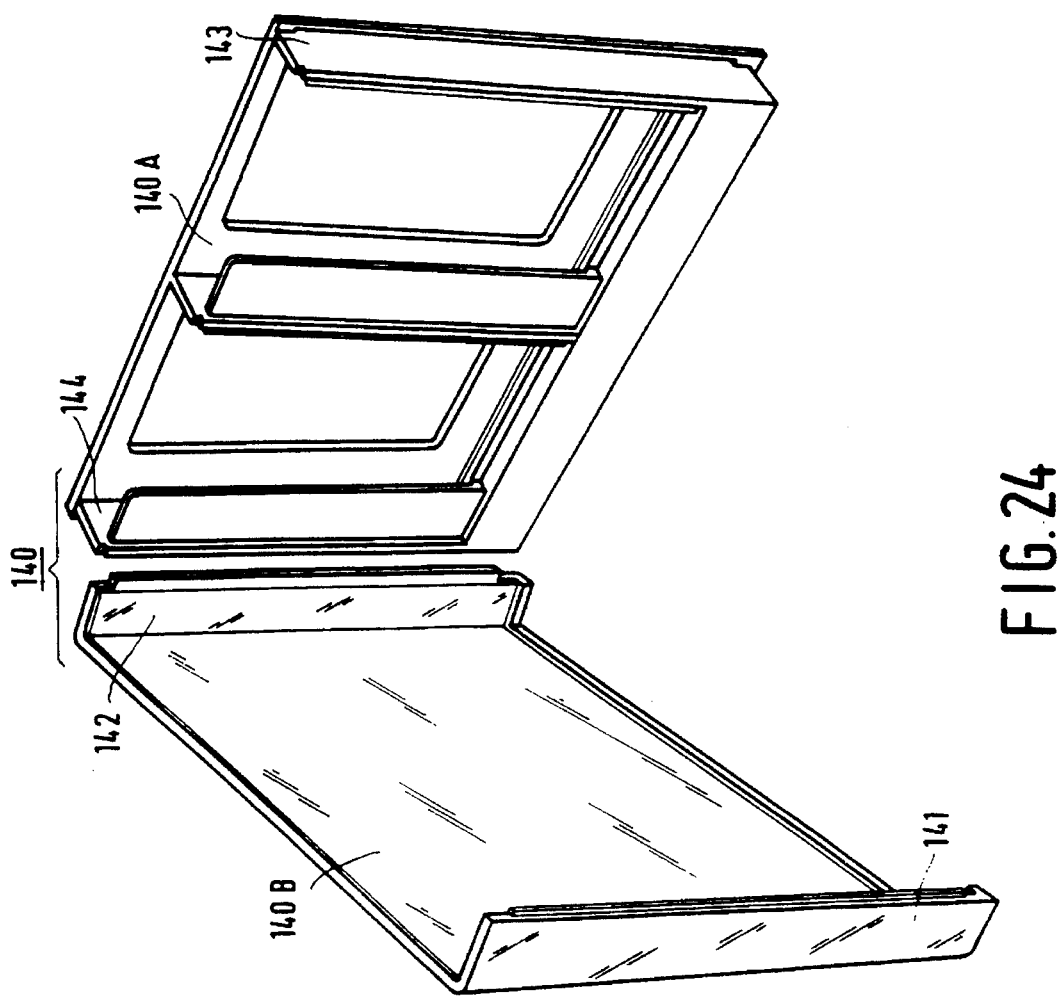
FIG. 24 is a perspective view of the empty holder of FIG. 23, viewed obliquely from the rear, the transparent rear part being removed from the non-transparent front part.

In the holder 140 shown in FIGS. 23, 24 the receiving spaces are arranged side by side. The transparent section 140B has side walls 141, 142 at both sides, which walls together with the walls 143, 144 of the non-transparent section 140A bound two flap spaces for side flaps of an enclosure. Thus, the flap at each side may contain information about the adjacent cassette. If desired, the outer dimensions of this holder may be selected in such a way that they correspond to the outer dimensions of the well-known CD-packages. This has the advantage that the holder fits in the displays designed for selling Compact Discs in music shops.

The invention also relates to an interesting method of removing a cassette from a holder. By taking the holder with the cassette clamped therein in one hand the cassette 2 can subsequently be pushed out at least partly through the open side 25 with the thumb of the same hand via the open window 26 in the front wall 20 of the holder. After this, the cassette can be removed completely from the holder, if necessary. This method may be of interest if after removal of the cassette from the holder, the cassette is to be loaded into an apparatus 40, see FIGS. 25 and 26. Loading is effected via a slot 41 in a front partel 42 of the apparatus. The apparatus shown may be, for example, a car-radio recorder and/or player but may alternatively be a portable or a stationary recorder and/or player or radio-recorder and/or player for home entertainment. The cassette is pushed out of the holder over some distance by means of the thumb and the part of the cassette which projects from the holder is inserted into the slot 41, after which the cassette is gripped by a loading mechanism (not shown) of the apparatus, which mechanism pulls the cassette completely out of the holder 1 into the apparatus. Loading mechanisms which automatically pull a cassette inserted partly in a slot further into an apparatus are widely known per se, for example from the afore-mentioned U.S. patent application Ser. No. 629,512, and are therefore not described herein. An important feature in this connection is the presence of a gripping recess 139 at the front of the part of the cassette 2 which projects from the holder. The loading mechanism may comprise gripping means which are engageable with the gripping recess 139 to pull the cassette inward.

Figure 25:
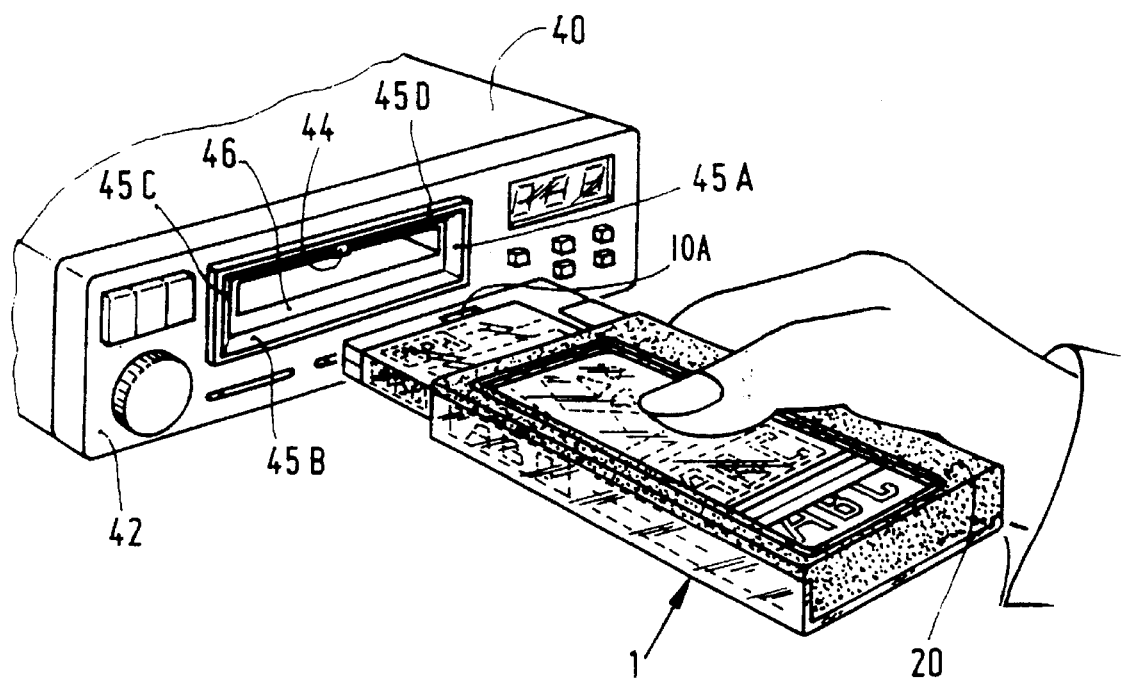
FIG. 25 is a perspective view of a car-radio/cassette player comprising docking means for docking a holder in accordance with the invention.

Insertion of the cassette into the slot 41 is possible in two ways. FIG. 25 shows that the cassette can first be pushed out of the holder over some distance with the thumb of one hand, after which this part which projects from the holder is inserted into the slot. Conversely, in the situation illustrated in FIG. 26, the holder is first positioned before the slot, after which the cassette is partly slid through the slot 41 in the apparatus by means of the thumb. However, this is not a basic difference. If it is difficult to position the holder correctly relative to the slot, the first method would seem to be preferable.

Figure 26:
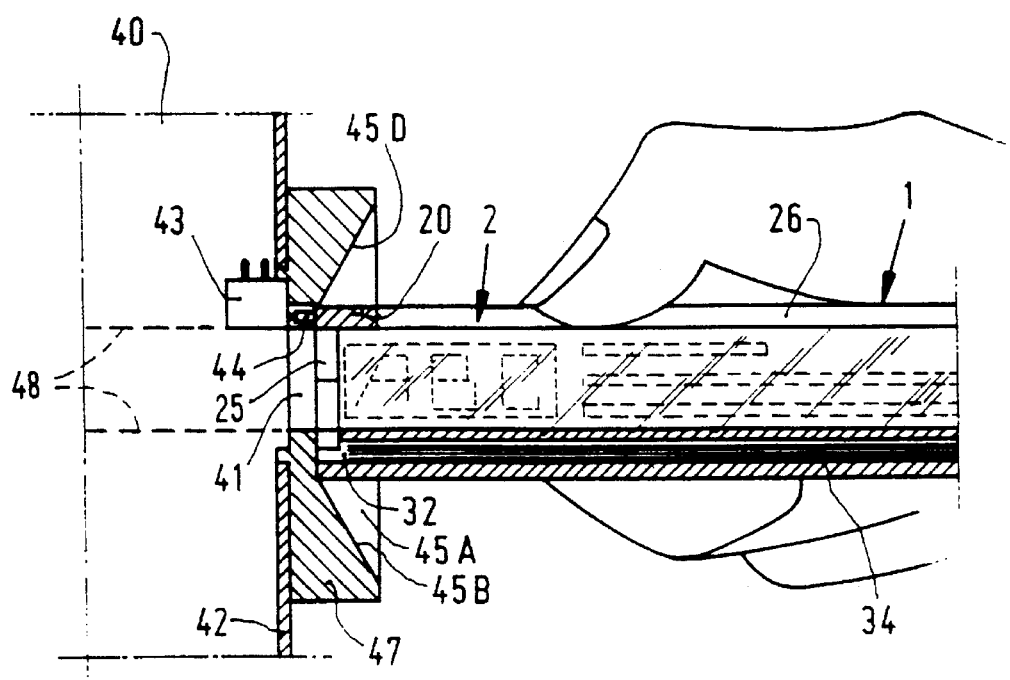
FIG. 26 is a cross-sectional view of the docking means shown in FIG. 25 with a holder provided with a cassette in the docked position.

For the reinsertion of the cassette into the holder, it is possible to use a method in accordance with which the holder 1 is positioned with its open side 25 before the front partel 42 at the location of the slot 41, after which the cassette is inserted, or at least partly inserted, into the holder by the apparatus via the slot 41. If the cassette is inserted only partly into the holder it can be inserted further by hand, for example by means of the thumb. FIGS. 25 and 26 show that it is possible to employ switching means, for example comprising a mechanical switch 43 with a push-button 44. The push-button 44 is actuated by the front wall 20 of the holder. As a result of this, the loading/unloading mechanism of the apparatus ejects the cassette by means of an electric motor. The ejection of a cassette by means of an electric motor through a slot in a magnetic recorder is generally known, see for example the afore-mentioned U.S. patent application Ser. No. 629,512, and is common practice particularly with car-radio recorder/players, so that no further explanation will be given about this aspect of the operation of the apparatus.

As already stated hereinbefore, it may sometimes be difficult to position the holder exactly before the slot 41. In view of this, means may be provided whereby the holder 1 is guided by guide surfaces 45A, B, C and D around the slot 41. The stop means comprises a stop edge 46 situated around the slot 41. Both the guide surfaces 45A to 45D and the stop edge 46 belong to a docking means comprising a plastic frame 47 secured in the front partel 42 and formed with the slot 41. The guide surfaces 45A to 45D are inclined relative to the stop edge 46 and, as a result of this inclined orientation, they assist in guiding the holder from an inexact coarse position into the unambiguously defined docking position necessary for sliding the cassette into or out of the holder.

In the docking position shown, as illustrated clearly in FIG. 26, the cassette is disposed exactly in line with the path 48 along which the cassette is moved by the loading mechanism of the apparatus. This is achieved in that the part of the stop edge 46 which is situated opposite the enclosure space 32 of the holder is wider than the part situated opposite the front wall 20. The receiving space of the holder is thus exactly aligned with the slot 41. This ensures an unobstructed insertion and removal of the cassette.

The apparatus 40 in accordance with the invention shown in FIGS. 25, 26 may be of an entirely different construction. For example, the docking means may have a different shape and, if desired, they may be integrated with the front partel 42. The switching means may be electronic or electro-optical instead of mechanical. The docking means may be arranged inside the apparatus. The automatic means for transport of the cassette may cooperate with the cassette via the window 26. The holder with the cassette may be inserted into the apparatus as a unit, the cassette then being removed from the holder inside the apparatus.

Although the holder of the invention has been described above for use with one or more magnetic-tape cassettes, the invention is not limited to use with such a recording medium. The holder in accordance with the invention can also be used for other suitable media, such as disc-shaped media with or without a cassette. Apart from magnetic media, optical, magneto-optical or any other record carriers may be stored in the holder.

We claim:
1. In combination, a magnetic tape cassette and a holder for the cassette,
which holder comprises a front wall and a rear wall, a plurality of transverse walls comprising two long side walls, one short bottom wall, and one open side opposite the short bottom wall, said holder walls bounding a cassette-receiving space into which the cassette can be inserted and extracted via the open side,
which cassette has a front wall bearing a label,
the front wall of the holder having at least one opening for viewing the label on the front wall of the cassette, and the rear wall of the holder being solid,
the holder provided with means for defining an internal enclosure space for the insertion of an enclosure adjacent the rear wall,
the holder including an enclosure in the enclosure space,
the enclosure having a side facing the rear wall and a side facing the opening in the front wall, the side of the enclosure facing the opening being visible from the outside through the opening in the front wall in the absence of the cassette and having an appearance which is at least substantially similar to the appearance of the label of the cassette.

2. A holder as claimed in claim 1, characterised in that the dimensions of the opening are substantially equal to the dimensions of the label receiving portion of the cassette.

3. A holder as claimed in claim 1, characterised in that the holder comprises internal means for clamping the cassette.

4. A holder as claimed in claim 3, characterised in that the clamping means comprises an elastic member which is situated in a transverse wall of the holder and which is deformed elastically by the cassette.

5. A holder as claimed in claim 4, characterised in that the elastic member is made of a material which is easier to deform than the holder.

6. A holder as claimed in claim 5, characterised in that the elastic member is made of a material having rubber-like properties.

7. A holder as claimed in claim 6, characterised in that the elastic member comprises a plug arranged in an opening in a transverse wall of the holder.

8. A holder as claimed in claim 1, characterised in that the enclosure space communicates with a flap space adjacent a side wall of the holder, and the enclosure has a side flap which extends in the flap space.

9. A holder as claimed in claim 1, characterised in that the holder comprises two separate sections which are secured to one another.

10. A holder as claimed in claim 9, characterised in that one section comprises the front wall with an adjoining side wall and the bottom wall, and the other section comprises the rear wall and the other side wall.

11. A holder as claimed in claim 10, characterised in that said other section is made of a transparent plastic.

12. A holder as claimed in claim 11, characterised in that said one section is made of a non-transparent plastic.

13. A holder as claimed in claim 1, characterised in that the means for defining the enclosure space comprises ridges on opposite sides for cooperation with the side edges of the enclosure, whereby the enclosure space is in open communication with the cassette receiving space.

14. A holder as claimed in claim 8, characterised in that the flap space is defined by an internal transverse wall and a side wall, in such a manner that the flap space is bounded by the side wall and the internal transverse wall.

15. A holder as claimed in claim 1, characterised in that the open side of the holder has a cover which is pivotally connected to the holder.

16. A holder as claimed in claim 15, characterised in that the pivotal connection comprises a plastic integral hinge.

17. A holder as claimed in claim 15, characterised in that the cover is pivotally connected to the rear wall of the holder.

18. A holder as claimed in claim 11, characterised in that the transparent part of the holder is made of a styrene/butadiene-block copolymer.

19. A holder as claimed in claim 1, characterised in that the holder has a plurality of cassette receiving spaces.

20. A holder as claimed in claim 14, characterized in that the internal transverse wall is part of the one section of the holder.

21. A holder as claimed in claim 1, characterized in that the opening is approximately coextensive with the label, and the wall having the opening is made of a non-transparent plastic, so that the wall substantially completely obscures those parts of the cassette present in the holder which adjoin the label.

22. In combination, a magnetic tape cassette and a holder for the cassette, which holder comprises a front wall and a rear wall, a plurality of transverse walls comprising two side walls, one bottom wall, and one open side opposite the bottom wall, said holder walls bounding a cassette-receiving space into which the cassette can be inserted and extracted via the open side, which cassette has a front wall bearing a label, the front wall of the holder having at least one opening for viewing the front wall of the cassette, the holder having an internal enclosure space adjacent the rear wall, the holder including an enclosure in the enclosure space, the enclosure having a side facing the rear wall and a side facing the opening in the front wall, the side of the enclosure facing the opening being visible from the outside through the opening in the front wall in the absence of the cassette and having an appearance which is at least substantially similar to the appearance of the label of the cassette.

* * * * *